(12) United States Patent
Shivakumar et al.

(10) Patent No.: US 12,521,405 B2
(45) Date of Patent: Jan. 13, 2026

(54) INJECTABLE COMPOSITIONS OF URSODEOXYCHOLIC ACID

(71) Applicant: SHILPA MEDICARE LIMITED, Raichur (IN)

(72) Inventors: Pradeep Shivakumar, Bengaluru (IN); Purushothama Narasiyappa, Bengaluru (IN); Kiran Kumar Cherukuri, Bengaluru (IN)

(73) Assignee: SHILPA PHARMA LIFESCIENCES LIMITED, Karnataka (IN)

( * ) Notice: Subject to any disclaimer, the term of this patent is extended or adjusted under 35 U.S.C. 154(b) by 906 days.

(21) Appl. No.: 17/773,622

(22) PCT Filed: Nov. 19, 2020

(86) PCT No.: PCT/IB2020/060883
§ 371 (c)(1),
(2) Date: May 2, 2022

(87) PCT Pub. No.: WO2021/099973
PCT Pub. Date: May 27, 2021

(65) Prior Publication Data
US 2022/0378803 A1 Dec. 1, 2022

(30) Foreign Application Priority Data

Nov. 22, 2019 (IN) .............. 201941047716

(51) Int. Cl.
*A61K 31/575* (2006.01)
*A61K 9/00* (2006.01)
*A61K 47/02* (2006.01)
*A61K 47/40* (2006.01)

(52) U.S. Cl.
CPC .......... *A61K 31/575* (2013.01); *A61K 9/0019* (2013.01); *A61K 47/02* (2013.01); *A61K 47/40* (2013.01)

(58) Field of Classification Search
CPC ...... A61K 9/0019; A61K 47/40; A61K 47/02; A61K 31/575
See application file for complete search history.

(56) References Cited

U.S. PATENT DOCUMENTS

| 5,534,505 A | 7/1996 | Widauer |
| 5,955,456 A * | 9/1999 | Prato .................. A61P 1/16 514/182 |

FOREIGN PATENT DOCUMENTS

| EP | 1147779 B1 | 5/2006 |
| WO | 2013057741 A2 | 4/2013 |
| WO | 2018147685 A1 | 8/2018 |

OTHER PUBLICATIONS

Zia (Journal of Pharmaceutical Sciences. vol. 86, No. 2, Feb. 1997) (Year: 1997).*
Khomutov (J Pharm Pharmacol. May 2002; 54(5):617-22.) (Year: 2002).*
Das (Indian Journal of Pharmaceutical Sciences. Jul. 2019. 81(4):589-600) (Year: 2019).*

* cited by examiner

*Primary Examiner* — Kortney L. Klinkel
*Assistant Examiner* — Richard Grant Peckham

(57) ABSTRACT

The present invention is directed to an injectable pharmaceutical composition comprising (a) ursodeoxycholic acid and (b) sulfobutylether-β-cyclodextrin. Such compositions exhibit unexpected solubility and stability of ursodeoxycholic acid permitting therapeutic dosages of the ursodeoxycholic acid to be administered without the use of high amounts of strong bases that are present in an amount stoichiometrically equivalent to the ursodeoxycholic acid.

9 Claims, No Drawings

INJECTABLE COMPOSITIONS OF URSODEOXYCHOLIC ACID

FIELD OF INVENTION

The present invention relates to injectable pharmaceutical compositions comprising ursodeoxycholic acid (UDCA) and sulfobutylether-β-cyclodextrin and method of making and using the same, for example to treat disorders and diseases that are therapeutically responsive to ursodeoxycholic acid.

BACKGROUND OF THE INVENTION

Ursodeoxycholic acid (UDCA) is a drug which is widely used in therapy as litholytics (gall stone dissolution and prevention) and in treatment of various pathological conditions of the liver such as hepatic cholestasis, primary biliary cirrhosis. Ursodeoxycholic acid is also reported for the treatment of non-alcoholic steatohepatitis (NASH). Further it has been found that ursodeoxycholic acid is also particularly useful in the treatment of pathological conditions of the liver in patients for whom oral administration is impossible or difficult. Ursodeoxycholic acid is marketed in USA with the brand name Actigall® (300 mg oral capsules) for the treatment of gall stone dissolution and gall stone prevention administered at a dose of 8-10 mg/kg/day in 2 or 3 divided doses and 600 mg/day (2 divided doses) respectively. Further ursodeoxycholic acid is marketed with the brand name Urso® (250 mg and 500 mg oral tablets) by Allergan and recommended dosage for treatment of treatment of primary biliary cirrhosis is 13-15 mg/kg/day administered in two to four divided doses with food.

No injectable pharmaceutical formulations based on ursodeoxycholic acid are currently available on the market because their preparation presents problems due to its physicochemical properties and high doses of ursodeoxycholic administration.

Ursodeoxycholic acid is a weak acid which is practically insoluble in water; its solubility increases greatly in the presence of strong bases such as sodium hydroxide and potassium hydroxide. However, aqueous solutions consisting solely of ursodeoxycholic acid and a strong base are not suitable for intravenous administration because even a small variation in the amount of strong base in the preparation leads to a consequent variation in the pH of the injectable solution which is often incompatible with intravenous administration.

Also, ursodeoxycholic acid is a detergent compound which cause foaming when added to an aqueous solution for intravenous perfusion.

In order to develop a stable well buffered intravenous solution suitable for intravenous administration the inventors of U.S. Pat. No. 5,955,456 have developed the injectable formulations of ursodeoxycholic acid comprising a strong base compatible with intravenous administration and trometamol. Further US '456 discloses the preferably the use sodium or potassium hydroxide as strong bases and such bases are used in a stoichiometrically equivalent amount relative to the acid (ursodeoxycholic acid) employed, and more preferably about 1% w/v of sodium hydroxide. US '456 uses a high amount of strong base in equal stoichiometric ratio of ursodeoxycholic acid that have disadvantages of not being suitable for intravenous administration that leads to variation of pH.

EP Patent No. EP1147779B1 discloses the method for rendering ursodeoxycholic acid in soluble form and specifically Example-4 discloses the injectable formulations of ursodeoxycholic acid and β-cyclodextrin in ratio of 1:2 dissolved in water to prepare an intravenous solution of 2 mg/mL ursodeoxycholic acid. The injectable solution for intravenous administration with β-cyclodextrin containing 2 mg/mL ursodeoxycholic acid requires large volume of liquid for intravenous administration (about 300 mL for the prevention of gall stone prevention).

In order to overcome the above disadvantages, there exists a need to develop an injectable pharmaceutical composition for intravenous administration with significantly reduced volume (better patient safety, children, fluid restriction patients etc), comprising ursodeoxycholic acid that is stable for intravenous administration without the variation of pH.

SUMMARY OF THE INVENTION

The present invention relates to ursodeoxycholic acid composition suitable for intravenous administration that is stable under ambient and/or refrigerated conditions with significantly reduced volume for intravenous administration and can provide fully dissolved ursodeoxycholic acid without the need of large amounts of strong bases. As described herein, compositions suitable for parenteral administration that include ursodeoxycholic acid and cyclodextrin derivative selected from the group consisting of hydroxypropyl-β-cyclodextrin and sulfobutylether-β-cyclodextrin.

The present invention is directed to an injectable pharmaceutical composition comprising ursodeoxycholic acid, cyclodextrin derivative selected from the group consisting of hydroxypropyl-β-cyclodextrin and sulfobutylether-β-cyclodextrin and an optional buffer.

The present invention is further directed to an injectable pharmaceutical composition comprising about 10 mg/mL to about 50 mg/mL ursodeoxycholic acid, about 100 mg/mL to about 300 mg/mL cyclodextrin derivative selected from the group consisting of hydroxypropyl-β-cyclodextrin and sulfobutylether-β-cyclodextrin and an optional buffer.

DETAILED DESCRIPTION OF THE INVENTION

The present invention provides an injectable pharmaceutical composition comprising ursodeoxycholic acid and cyclodextrin derivative selected from the group consisting of hydroxypropyl-β-cyclodextrin and sulfobutylether-β-cyclodextrin. Most preferably the cyclodextrin derivate used in the present invention is sulfobutylether-β-cyclodextrin.

In a preferred embodiment, the present invention provides an injectable pharmaceutical composition comprising (a) ursodeoxycholic acid and (b) sulfobutyl ether-β-cyclodextrin.

In a further embodiment, the present invention provides an injectable pharmaceutical composition comprising (a) ursodeoxycholic acid and (b) sulfobutyl ether-β-cyclodextrin, wherein such composition does not contain high amounts of strong bases (preferably sodium hydroxide and potassium hydroxide) that are present in an amount stoichiometrically equivalent to the ursodeoxycholic acid.

In one embodiment, the present invention provides an intravenous pharmaceutical composition comprising ursodeoxycholic acid, cyclodextrin derivative selected from the group consisting of hydroxypropyl-β-cyclodextrin and sulfobutylether-β-cyclodextrin and an optional buffer.

In another embodiment, the present invention provides a stable injectable pharmaceutical composition comprising ursodeoxycholic acid, cyclodextrin derivative selected from the group consisting of hydroxypropyl-β-cyclodextrin and sulfobutylether-β-cyclodextrin and an optional buffer.

In another embodiment, the present invention provides an injectable pharmaceutical composition comprising about 10 mg/mL to about 50 mg/mL ursodeoxycholic acid, more preferably about 15 mg/mL to about 40 mg/mL of ursodeoxycholic acid and most preferably of about 25 mg/mL of ursodeoxycholic acid.

In a further embodiment, the present invention provides an injectable pharmaceutical composition comprising about 100 mg/mL to about 300 mg/mL of sulfobutylether-β-cyclodextrin, more preferably about 150 mg/mL to about 250 mg/mL of sulfobutylether-β-cyclodextrin.

In another embodiment, the present invention provides an injectable pharmaceutical composition comprising (a) about 10 mg/mL to about 50 mg/mL of ursodeoxycholic acid and (b) about 150 mg/mL to about 250 mg/mL of sulfobutylether-β-cyclodextrin.

In a still further embodiment, the present invention provides an injectable pharmaceutical composition comprising (a) about 10 mg/mL to about 50 mg/mL of ursodeoxycholic acid and (b) about 150 mg/mL to about 250 mg/mL of sulfobutylether-β-cyclodextrin, wherein such composition does not contain high amounts of strong bases (preferably sodium hydroxide and potassium hydroxide) that are present in an amount stoichiometrically equivalent to the ursodeoxycholic acid.

In embodiments of the invention, the present invention provides an injectable pharmaceutical composition comprising (a) about 10 mg/mL to about 50 mg/mL ursodeoxycholic acid, (b) about 150 mg/mL to about 250 mg/mL cyclodextrin derivative selected from the group consisting of hydroxypropyl-β-cyclodextrin and sulfobutylether-β-cyclodextrin and an optional buffer.

In further embodiments of the invention, the present invention provides a stable injectable pharmaceutical composition consisting essentially (a) about 10 mg/mL to about 50 mg/mL ursodeoxycholic acid, (b) about 100 mg/mL to about 300 mg/mL cyclodextrin derivative selected from the group consisting of hydroxypropyl-β-cyclodextrin and sulfobutyl ether-β-cyclodextrin and an optional buffer.

In a still further embodiment of the invention, the present invention provides a stable injectable pharmaceutical composition consisting essentially about 25 mg/mL ursodeoxycholic acid and about 150 mg/mL to about 250 mg/mL cyclodextrin derivative selected from the group consisting of hydroxypropyl-β-cyclodextrin and sulfobutyl ether-β-cyclodextrin.

In another embodiment of the invention, the present provides a stable injectable pharmaceutical composition consisting essentially about 25 mg/mL ursodeoxycholic acid and about 150 mg/mL to about 250 mg/mL cyclodextrin derivative selected from the group consisting of hydroxypropyl-β-cyclodextrin and sulfobutyl ether-β-cyclodextrin used for the treatment of various pathological conditions of the liver such as hepatic cholestasis, primary biliary cirrhosis and non-alcoholic steatohepatitis (NASH).

In another embodiment of the invention, the present invention provides a stable injectable pharmaceutical composition comprising ursodeoxycholic acid, cyclodextrin derivative selected from the group consisting of hydroxypropyl-β-cyclodextrin and sulfobutyl ether-β-cyclodextrin, optionally a pH adjusting agent and water.

The present injectable pharmaceutical compositions optionally further comprise pH adjusting agents. The pH adjusting agents used in the present invention is selected from group consisting of sodium hydroxide and hydrochloric acid. The pH of the injectable composition of the present invention is of about 2.0 to about 8.0. The pH of the injectable composition preferably used in the present invention is of about 2.0 to about 4.0.

In a still further embodiment, the present invention provides an injectable pharmaceutical composition comprising ursodeoxycholic acid, cyclodextrin derivative selected from the group consisting of hydroxypropyl-β-cyclodextrin and sulfobutylether-β-cyclodextrin, optionally a pH adjusting agent and water, wherein the pH of the composition is of about 2.0 to about 8.0.

In another embodiment, the present invention provides an injectable pharmaceutical composition comprising (a) ursodeoxycholic acid (b) sulfobutylether-β-cyclodextrin, (c) water and (d) optionally a pH adjusting agent.

In a further embodiment, the present invention provides an injectable pharmaceutical composition comprising (a) about 10 mg/mL to about 50 mg/mL of ursodeoxycholic acid (b) about 150 mg/mL to 250 mg/mL of sulfobutylether-β-cyclodextrin, (c) water and (d) optionally a pH adjusting agent.

In another embodiment, the present invention provides an injectable pharmaceutical composition consisting of (a) about 10 mg/mL to about 50 mg/mL ursodeoxycholic acid, (b) about 150 mg/mL to about 250 mg/mL sulfobutylether-β-cyclodextrin and (c) water, wherein the pH of the composition is about 2.0 to about 4.0.

The osmolality of the composition may be determined by freezing point depression method, but any other suitable method may also be used. According to one embodiment, the osmolality of the composition of the present invention ranges from about 180 mOs/Kg to about 900 mOs/Kg, preferably from about 600 mOs/Kg to about 800 mOs/Kg.

The present invention further provides an injectable pharmaceutical composition consisting of (a) about 10 mg/mL to about 50 mg/mL ursodeoxycholic acid, (b) about 150 mg/mL to about 250 mg/mL sulfobutylether-β-cyclodextrin and (c) water, wherein the pH of the composition is about 2.0 to about 4.0 and wherein the osmolality of the composition is about 600 mOs/Kg to about 800 mOs/Kg.

According to another of its aspects, the present invention relates to the use of ursodeoxycholic acid for the preparation of injectable formulations suitable for the treatment of pathological conditions of the liver such as hepatic cholestasis, primary biliary cirrhosis and non-alcoholic steatohepatitis (NASH).

In embodiments of the invention, the invention relates to injectable formulation of ursodeoxycholic acid for intravenous administration, especially by slow perfusion. In further embodiments of the invention, the injectable formulation of ursodeoxycholic acid is diluted in the solution for intravenous perfusion in order to be administered by slow perfusion. Particularly advantageous solution for intravenous perfusion is the conventional isotonic solution (containing 0.9% of sodium chloride).

The duration of the treatment involving the slow intravenous perfusion of ursodeoxycholic acid administered preferably by means of the formulation forming the subject of the invention, varies according to the pathological conditions to be treated. In general, said duration varies from 1 to 30 days, advantageously from 3 to 10 days and preferably from 5 to 7 days. Several treatment cycles can be carried out if necessary.

In general, the daily dose of ursodeoxycholic acid to be administered according to the present invention is between 2 and 30 mg/kg body weight, advantageously between 4 and 20 mg/kg and preferably between 8 and 15 mg/kg. For an adult of normal constitution, the daily dose is between 500 and 2000 mg.

The unit doses can therefore contain from 100 to 2000 mg of ursodeoxycholic acid. According to one preferred aspect, the unit doses contain 250 mg, 500 mg or 625 mg of ursodeoxycholic acid in volumes of 10 ml, 20 ml and 25 ml respectively.

The following examples are provided to illustrate the present invention. It is understood, however, that the invention is not limited to the specific conditions or details described in the example below. The example should not be construed as limiting the invention as the examples merely provide specific methodology useful in the understanding and practice of the invention and its various aspects. While certain preferred and alternative embodiments of the invention have been set forth for purposes of disclosing the invention, modification to the disclosed embodiments can occur to those who are skilled in the art.

Example 1

Injectable Composition of Ursodeoxycholic Acid

| S.No | Ingredients | Quantity/mL |
|---|---|---|
| 1 | Ursodeoxycholic acid | 25 mg |
| 2 | Sulfobutylether-β-cyclodextrin | 184.85 mg |
| 3 | Sodium hydroxide | Q.s to pH between 7.3 and 7.5 |
| 4 | Water for Injection | Q.s to 1 mL |

Process for Preparation:

Sulfobutyl ether-β-cyclodextrin is dissolved in required quantity of water for injection and further ursodeoxycholic acid is dissolved and the pH is adjusted with sodium hydroxide between 7.3 and 7.5 to form a final solution which is filtered and sterilized by using aseptic filtration and/or by autoclaving.

The injectable pharmaceutical composition as prepared in example 1 is stored at 40° C./75% RH for about six months and the pH, osmolality, Assay and Related substances are presented in Table-1.

TABLE 1

| Condition | Time point | pH | Osmolality (mOsm/kg) | Assay by HPLC (% w/w) | Related Substance (% w/w) | | | |
|---|---|---|---|---|---|---|---|---|
| | | | | | Known Impurity | Unknown Impurity | Highest unknown Impurity | Total Impurities |
| Initial | Initial | 6.47 | 726 | 100.4 | 0.03 | 0.04 | 0.04 | 0.07 |
| 40° C. ± 2° C./ 75% RH ± 5% RH | 1st Month | 7.51 | 773 | 100.0 | 0.03 | 0.05 | 0.05 | 0.08 |
| | 2nd Month | 7.47 | 801 | 102.9 | 0.02 | 0.05 | 0.05 | 0.06 |
| | 3rd Month | 7.51 | — | 99.6 | 0.03 | 0.06 | 0.06 | 0.09 |
| | 6th Month | 7.50 | 704 | 101.3 | 0.02 | 0.05 | 0.05 | 0.07 |

Example 2

Injectable Composition of Ursodeoxycholic Acid

| S.No | Ingredients | Quantity/mL |
|---|---|---|
| 1 | Ursodeoxycholic acid | 25 mg |
| 2 | Hydroxypropyl-β-cyclodextrin | 175.175 mg |
| 3 | Sodium hydroxide | Q.s to pH between 7.3 and 7.5 |
| 4 | Water for Injection | Q.s to 1 mL |

Process for Preparation:

Hydroxypropyl-β-cyclodextrin is dissolved in required quantity of water for injection and further ursodeoxycholic acid is dissolved and the pH is adjusted with sodium hydroxide between 7.3 and 7.5 to form a final solution which is filtered and sterilized by using aseptic filtration and/or by autoclaving.

Example 3

Ursodeoxycholic Acid Solubility in sulfobutylether-β-cyclodextrin (SBECD)

Ursodeoxycholic acid was mixed with sulfobutylether-β-cyclodextrin in water and the resulting solutions was filtered through 0.22 μm filter and the clear filtrate solution was analysed by HPLC. The assay of ursodeoxycholic acid is presented in the Table-2.

TABLE 2

| S.No | UDCA mg/mL | SBECD mg/mL | Molar ratio of UDCA: SBECD | Assay by HPLC of UDCA after filtration (0.22 μm filter) |
|---|---|---|---|---|
| 1. | 25 | 138 | 1:1 | 89.2 |
| 2. | 25 | 152 | 1:1.1 | 97.5 |
| 3. | 25 | 165 | 1:1.2 | 97.8 |
| 4. | 25 | 179 | 1:1.3 | 100.3 |
| 5. | 25 | 185 | 1:1.34 | 100.2 |
| 6. | 25 | 193 | 1:1.4 | 101.1 |
| 7. | 25 | 207 | 1:1.5 | 99.3 |

Example 4

Injectable Composition of Ursodeoxycholic Acid

| S.No | Ingredients | Quantity/mL |
|---|---|---|
| 1 | Ursodeoxycholic acid | 25 mg |
| 2 | Sulfobutylether-β-cyclodextrin | 185 mg |

-continued

| S.No | Ingredients | Quantity/mL |
|---|---|---|
| 3 | Sodium hydroxide | Q.S to adjust pH between 2.5-4.0 |
| 4 | Hydrochloric acid | Q.S to adjust pH between 2.5-4.0 |
| 5 | Water for Injection | Q.s to 1 mL |

Process for Preparation

Sulfobutylether-β-cyclodextrin is dissolved in required quantity of water for injection and further ursodeoxycholic acid is dissolved and the pH is adjusted with sodium hydroxide or hydrochloric acid between 2.5 to 4.0 to form a final solution which is filtered and sterilized by using aseptic filtration and/or by autoclaving in glass vials each glass vial containing 25 mL of final solution (containing 625 mg of UDCA).

The injectable pharmaceutical composition as prepared in example 4 is stored at 40° C./75% RH for about three months and the pH, osmolality, Assay and Related substances are presented in Table-3.

TABLE 3

| Time Points | pH | Osmolality (mOs/Kg) | Assay | Related Substances | | |
|---|---|---|---|---|---|---|
| | | | | Chenodiol Impurity | Lithocholic acid Impurity | Total Impurities |
| Initial | 3.42 | 637 | 99.7 | 0.47 | 0.02 | 0.51 |
| 1M | 3.40 | 635 | 99.2 | 0.47 | 0.02 | 0.52 |
| 2M | 3.42 | 640 | 99.4 | 0.47 | 0.03 | 0.54 |
| 3M | 3.41 | 617 | 99.0 | 0.46 | 0.02 | 0.51 |

The invention claimed is:

1. An injectable pharmaceutical composition comprising
(a) ursodeoxycholic acid and
(b) sulfobutylether-β-cyclodextrin.

2. The composition as claimed in claim 1 wherein the composition comprises about 10 mg/mL to about 50 mg/mL ursodeoxycholic acid.

3. The composition as claimed in claim 1 wherein the composition does not contain high amounts of strong bases that are present in an amount stoichiometrically equivalent to the ursodeoxycholic acid.

4. The composition as claimed in claim 2 wherein the composition comprises about 25 mg/mL of ursodeoxycholic acid.

5. The composition as claimed in claim 1 wherein the composition comprises about 150 mg/mL to about 250 mg/mL sulfobutylether-β-cyclodextrin.

6. The composition as claimed in claim 1 wherein the composition is used for the treatment of various pathological conditions of the liver selected from the group consisting of hepatic cholestasis, primary biliary cirrhosis and non-alcoholic steatohepatitis (NASH).

7. The composition as claimed in claim 1 wherein said composition is in the form of an aqueous solution suitable for intravenous injection or infusion.

8. An injectable pharmaceutical composition comprising
(a) about 10 mg/mL to about 50 mg/mL ursodeoxycholic acid,
(b) about 150 mg/mL to about 250 mg/mL sulfobutylether-β-cyclodextrin,
(c) water and
(d) optionally a pH adjusting agent.

9. An injectable pharmaceutical composition consisting of
(a) about 10 mg/mL to about 50 mg/mL ursodeoxycholic acid,
(b) about 150 mg/mL to about 250 mg/mL sulfobutylether-β-cyclodextrin and
(c) water,
wherein the pH of the composition is about 2.0 to about 4.0.

* * * * *